United States Patent [19]

Driller et al.

[11] 4,091,549
[45] May 30, 1978

[54] PACEMAKER TRAINING AID

[76] Inventors: Jack Driller, 281 Kenilworth Rd.;
David Porter, 714 Howard Rd., both
of Ridgewood, N.J. 07450; William
Henriksen, 1474 Motor Pkwy.,
Hauppauge, N.Y. 11787

[21] Appl. No.: 814,406

[22] Filed: Jul. 11, 1977

[51] Int. Cl.² .............................................. G09B 23/28
[52] U.S. Cl. ........................................................ 35/17
[58] Field of Search .............................................. 35/17

[56] References Cited
U.S. PATENT DOCUMENTS

| | | | |
|---|---|---|---|
| 3,178,833 | 4/1965 | Gulbransen | 35/17 |
| 3,688,008 | 8/1972 | Krieger | 35/17 |

Primary Examiner—Harland S. Skogquist
Attorney, Agent, or Firm—McAulay, Fields, Fisher & Goldstein

[57] ABSTRACT

A pacemaker training aid for use in explaining the conduction system of the heart and the therapy provided by the use of a pacemaker, utilizes an illustration of the heart having lights associated therewith to show the sequence of transmission of command signals that normally cause proper action of heart chambers; the sequence of transmission of command signals usually present during improper or abnormal operation of the heart; and the effect of a pacemaker on such irregularities.

The lights are mounted at various predetermined locations on or behind the illustration in order to simulate the location of various physiological entities; the illustration is usually in the form of a color transparency. A means for controlling the sequence of illumination is provided. The sequence is determined by the normal or irregular cardiac condition which it is desired to illustrate. The placement of a pacemaker and its effect on the cardiac condition or the operation of the heart may also be illustrated, by use of a dummy pacemaker and electrode which can be attached to the training aid during the training session and an illumination sequence control which illustrates the pacemaker's effect on the heart's operation.

5 Claims, 4 Drawing Figures

- 30 NORMAL
- 31 COMPLETE BLOCK
- 32 BRADY CARDIA
- 33 ATRIAL TACHYCARDIA
- 34 VENTRICULAR FIBRILLATION
- 35 FIXED RATE VENTRICULAR PACING
- 36 FIXED RATE ATRIAL PACING
- 37 NON-COMPETITIVE VENTRICULAR PACING
- 38 BI-FOCAL SEQUENTIAL PACING

PACEMAKER TRAINING AID

BACKGROUND OF THE INVENTION

There is a need for a training aid to explain the normal and abnormal function of the conduction system of the heart and to explain how the pacemaker stimulates normal heart function in the presence of abnormal function of the heart conduction system. Nurses, medical students and pacemaker clinic technicians are among those who require such a training aid. However, patients who require pacemakers also require a simple easily understood explanation to increase patient confidence in this treatment modality and to reduce patient apprehension and psychosomatic manifestations.

Accordingly, it is a major purpose of this invention to provide a training aid which will be effective for both technicians and patients.

It is another purpose of this invention to provide a training aid which is simple enough to be used with a wide variety of individuals having a wide variety of background knowledge.

It is a further purpose of this invention to provide a training aid which is inexpensive, simple to operate and relatively free from breakdown and that requires little or no maintenance so that it can be prepared in a large quantity and used in a wide variety of settings.

BRIEF DESCRIPTION OF THE INVENTION

A teaching device, according to the present invention, includes a display portion having an illustration of a heart with a series of light emitting devices arranged to illuminate various predetermined portions of the illustration, which portions represent the following physiological entities: SA node, left atrium, right atrium, AV node, proximal common bundle of His, distal common bundle of His, right bundle branch, left bundle branch, Purkinje fibers right side, Purkinje fibers left side, left ventricle, and right ventricle. A table of available cardiac condition sequences is shown adjacent to the illustration. The particular sequence being shown is identified by a light emitting device adjacent to the description of that sequence (eg. see Table II). Selection of any sequence is made by depressing a particular selector button located on a control panel which may be adjacent to but not a part of the display panel shown in FIG. 1. The control panel, since it contains a limited number of control parts, can also be a hand held unit connected to the overall device by a long flexible cable. The illustration is advantageously a color transparency behind which the light emitting devices may be mounted. The light emitting devices are driven by a means which provides sequential control, the sequence of which is varied depending on the cardiac condition being displayed. Normally solid state digital devices would be used but any other means may be applied, such as a motor-driven switch. For convenience of operation, each sequence is fixed and not reprogrammable. Although any sequence may be programmed, only certain predetermined sequences properly represent the normally encountered heart malfunctions. Use of fixed sequences results in circuit economy and aids in the recognition of the fixed physiology of the more common cardiac arrythmias. Means are also provided to control the speed of each sequence and to step through any sequence under manual control.

BRIEF DESCRIPTION OF THE DRAWINGS

Reference is made to the drawings wherein.

DESCRIPTION OF THE PREFERRED EMBODIMENTS

The physical size of the device is controlled by the final use for which it is to be employed: a large device is useful for group instruction or explanation while smaller devices will suffice for instruction or explanation to one or two individuals.

Figure 1:
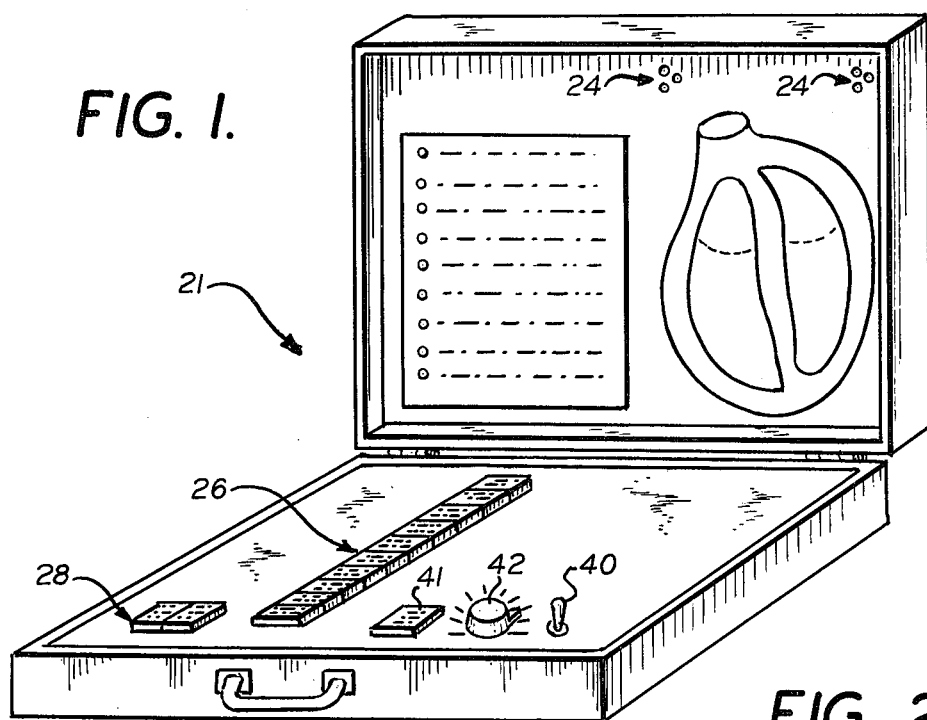
FIG. 1 is a perspective view of the invention showing a color transparency with an illustration of a human heart, the illuminated function table, the location of various controls, and the location of jacks for securing the dummy pacemaker and associated dummy electrode to the device at one of two alternative positions.
Figure 2:
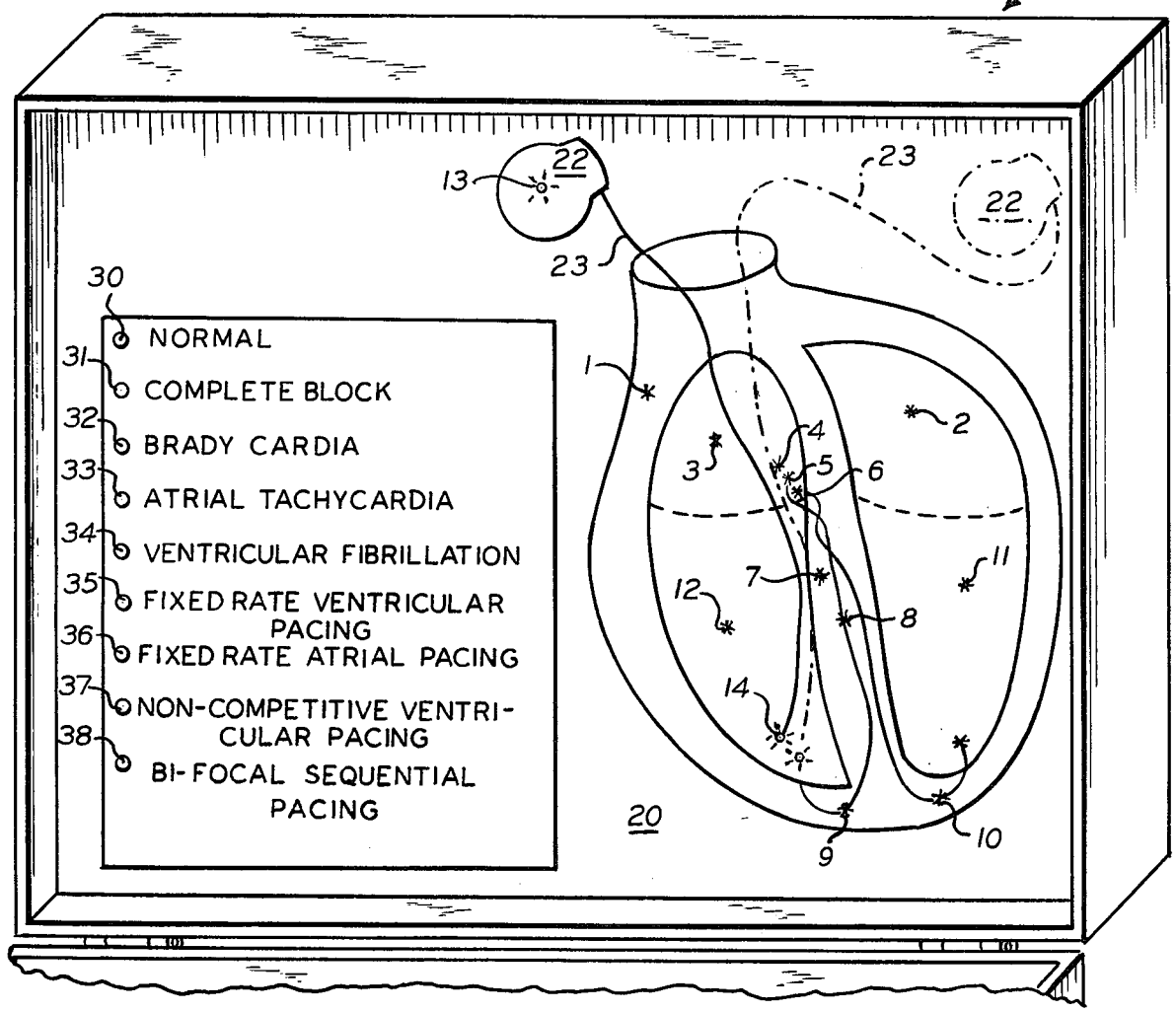
FIG. 2 is a fragmentary view of the device of FIG. 1, showing details of the color transparency, including the location of the light emitting devices which illuminate various portions on the illustration.

With reference to FIGS. 1 and 2 a color transparency 20 showing an illustration of a heart is mounted on a support 21, conveniently a hinged carrying case as shown in FIG. 1. There is provided, at various predetermined approximate positions 1–12, and 30–38 light emitting devices mounted behind the transparency. Each of the positions 1–12 represents a physiological function as follows:

1. SA Node (Sinoatrial Node)
2. Left Atrium
3. Right Atrium
4. AV Node (Atrioventricular Node)
5. Proximal Common Bundle of His
6. Distal Common Bundle of His
7. Right Bundle Branch
8. Left Bundle Branch
9. Right Purkinje Fibers
10. Left Purkinje Fibers
11. Left Ventricle
12. Right Ventricle A dummy pacemaker 22 and a dummy electrode 23 are also provided. These have illuminating entities at 13, 14, respectively, in order to indicate when they are producing pacing pluses.

Positions 30–38 when illuminated indicate which sequence has been chosen for illustration, as described below.

The dummy pacemaker is shown in FIG. 2 with an alternate position indicated in dotted lines. It is removably attached to the front of the transparency 20, normally by means of jacks 24 shown in FIG. 1 and matching plugs (not shown) on the dummy pacemaker 22, for use during an explanation session. The alternate position reflects the possible alternate surgical placement of a pacemaker. The dummy pacemaker 22 and the dummy electrode 23 may be separated from each other to explain replacement of exhausted or defective pacemakers without removal of the electrode 23 from the "heart." Three jacks are provided to physically attach and electrically connect dummy pacemakers which simulate pacemakers which stimulate only the ventricle or pacemakers which stimulate both the atrium and the ventricle with two separate electrodes. Although the change in sequence from abnormal to normal, for reasons of circuit economy, is preferably controlled by the operator who will select the appropriate sequence, attachment of the dummy pacemaker may be utilized directly to cause the sequence to be changed from one representing an abnormal condition to one representing a corrected condition, by suitable modification of the circuit.

In the preferred embodiment, the illustration of the heart is reproduced on a large transparency 20 mounted on the front of support 21, with the light emitting devices mounted behind the transparency 20 to illuminate the positions 1-12, and 30-38; but other constructions will be obvious to a person skilled in the art. The light emitting devices themselves, (not shown) will not normally be visible; only the light which they emit will be visible through the transparency. The light emitting devices may comprise any well-known device, for example, incandescent bulbs or light emitting diodes (LED). The LED's are generally preferred because of their low current drain and because of their longer life. Several LED's may necessarily be wired together at each predetermined position 1-12, 13, 14, and 30-38 in order to provide for enhanced visibility. A supplemental light, such as a fluorescent light may, of course, be included behind the transparency to provide general background illumination.

Providing a function-selector switch 26 with indexing corresponding to positions 30-38, and an "on-off" switch 28, on the support 21 permits convenient operation of the teaching aid. One of the positions 30-38 will be illuminated to indicate which function has been selected on switch 26.

One position on this switch 26 will be a "test" function which will cause all light emitting devices to be illuminated to assure all are functioning properly.

A potentiometer, not shown, which can be incorporated into the device, is varied by a control knob 42 to vary the recycling speed of the selected function. Speed can be controlled from typically 100 cycles per minute to standstill (zero cycles per minute). At standstill, manual stepping is provided by depressing a switch 41. A switch 40 can be incorporated to permit selection of the "automatic" or "manual step" mode of operation.

Figure 3:
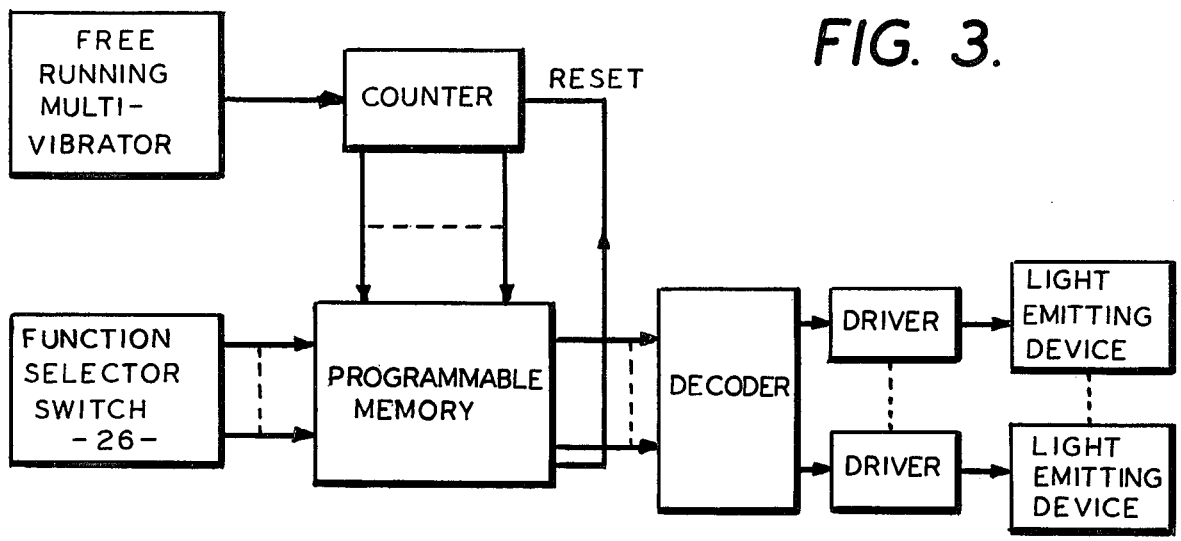
FIG. 3 is a block diagram of a digital control circuit for use in activating the light emitting devices in a predetermined sequence.
Figure 4:
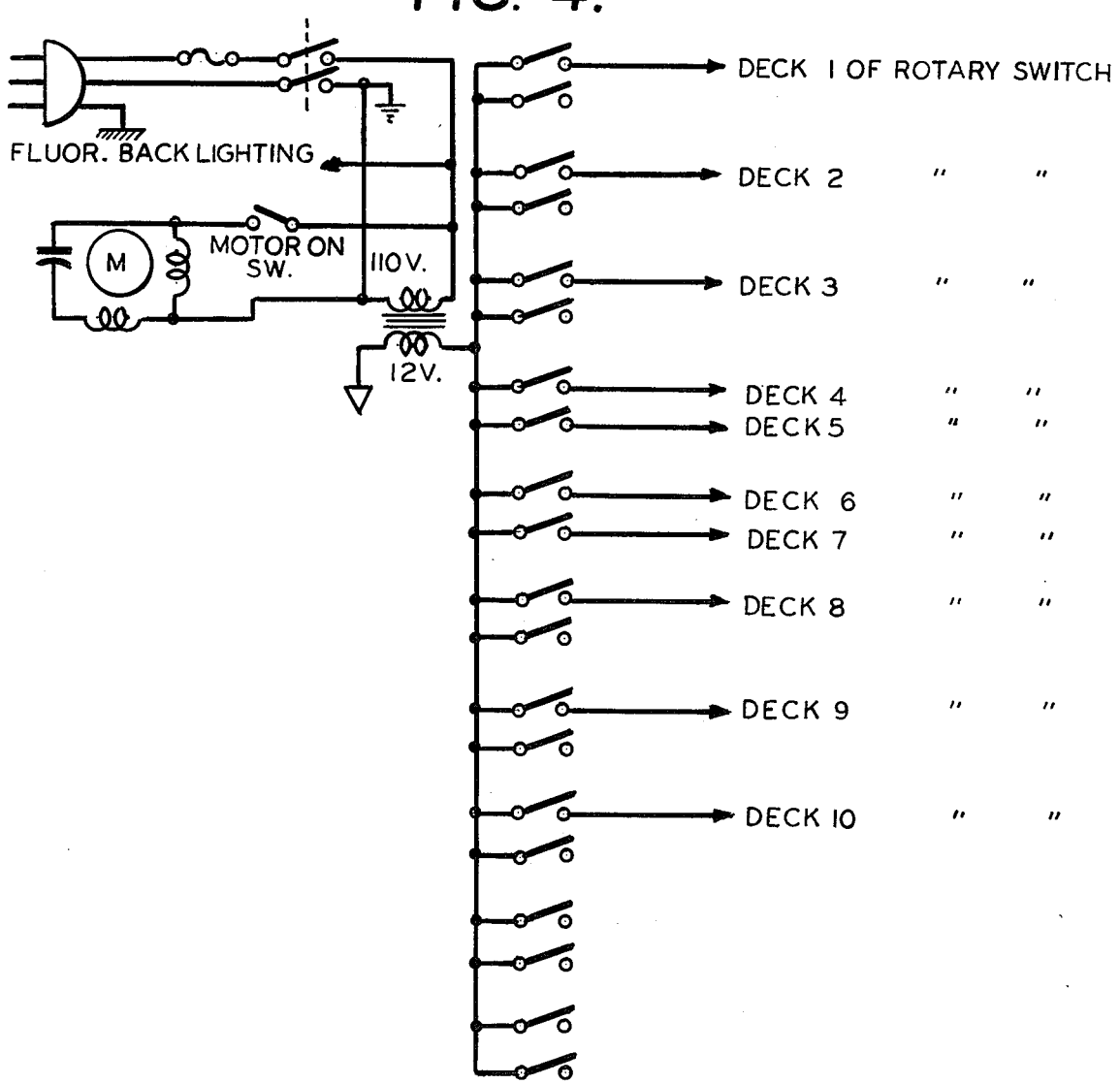
FIG. 4 is a simplified schematic of electro-mechanical control system using motor driven multi-deck rotary switches which may be wired to control the light emitting devices shown in FIG. 2.

The control of the sequence in which each lamp or LED is illuminated may be provided by a digital circuit device such as shown in FIG. 3, a motor driven, multi-deck rotary switch bank as shown in FIG. 4, or other suitable means.

For economy of circuit and to help further illustrate the fixed physiology of the more common cardiac arrythmias, a series of predetermined sequences are normally used rather than providing for at-will programming. Although any sequence may, of course, be programmed, the more usual heart malfunction sequences are preferably employed. Sequences suitable for implementation by means of a motor-driven, multi-deck rotary switch are given in Table II. Each sequence has been assigned one or two switch decks, as shown in FIG. 4. Table II, therefore, shows a number of typical cardiac functions (or malfunctions) which could be illustrated by means of the present invention, and the sequence of illumination associated will each function. For more complex sequences involving, for example, simultaneous activation of light emitters, the digital means suggested by FIG. 3 would be the preferred control circuit.

The repetition rate for each sequence depends, as does the sequence itself, on the function being illustrated. Thus, for example, the "normal" rate is approximately 1 cycle per second, while the "bradycardia" rate is approximately 1 cycle per 3 seconds. Some sequences will be mixed, for example, the "complete heart block" has an atrial sequence of 1 cycle per second with a ventricular sequence of 1 cycle per 4 seconds.

Table I is a key to the symbols used in Table II and in FIG. 2.

Table I

| PHYSIOLOGICAL ENTITIES | | |
|---|---|---|
| | Corresponding Designation | |
| Complete Name | In FIG. 2 | In Table II |
| Sinoatrial Node | 1 | A |
| Left and Right Atrium (simultaneously) | 3,2 | B |
| Atrioventricular Node | 4 | C |
| Proximal Common Bundle of His | 5 | D |
| Distal Common Bundle of His | 6 | E |
| Bundle Branch, Left and Right Side (simultaneously) | 7,8 | F |
| Purkinje Fibres, Left and Right Side; and Left and Right Ventricle (simultaneously) | 9,10,11,12 | G |
| Pacemaker and Electrode | 22,23 | H |

Table II

| Sequence | Deck | Step Number | | | | | | | | | | | | | | | | | | | | | | |
|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Normal | 1 | A | B | C | D | E | F | G | — | A | B | C | D | E | F | G | A | B | C | D | E | F | G | — |
| Complete Block | 2 | A | B | C | — | — | — | — | — | A | B | C | — | — | — | — | A | B | C | — | — | — | G | — |
| Bradycardia | 3 | A | B | C | D | E | F | G | — | — | — | — | — | — | — | — | — | — | — | — | — | — | — | — |
| Atrial Tachy | 4 | A | B | A | B | A | B | A | B | A | B | A | B | A | B | A | B | A | B | A | B | A | B | — |
| " | 5 | — | — | C | D | E | F | G | — | — | — | C | D | E | F | G | — | — | C | D | E | F | G | — |
| Vent. Fibrillation | 6 | A | B | — | — | — | — | — | — | A | B | — | — | — | — | — | A | B | — | — | — | — | — | — |
| " | 7 | D | G | F | E | G | D | F | G | E | F | D | G | E | G | D | F | E | G | D | F | G | F | E |
| Fixed Rate Vent. Pacing | 8 | A | B | — | — | — | H | G | — | A | B | — | — | — | H | G | A | B | — | — | — | H | G | — |
| Fixed Rate Atrial Pacing | 9 | H | B | C | D | E | F | G | — | H | B | C | D | E | F | G | H | B | C | D | E | F | G | — |
| Non-Competitive Ventricular Pacing | 10 | A | B | — | — | — | H | G | — | A | B | — | — | — | H | G | A | B | C | D | E | F | G | — |

I wish it to be understood that I do not desire to be limited to the exact details of construction shown and described, for obvious modifications will occur to a person skilled in the art.

I claim:

1. A teaching device, for illustrating the operation of a heart by illuminating various predetermined portions, in a predetermined sequence, of an illustration of a human heart, to display the sequence of command signals received by those portions of the heart for control of their normal or abnormal operation and the effect that a pacemaker has on the sequence of command signals received by the abnormal heart, comprising:
- an illustration of a heart indicating various heart elements including at least the four major chambers, atrioventricular and sinoatrial nodes, proximal and distal portions of the common bundle of His, left and right bundle branches and left and right side Purkinje fibers,
- light emitting means for separately illuminating each one of said illustrated elements,
- control means selectively operable to sequentially illuminate each of said light emitting means, and consequently said elements, in at least a first predetermined illumination sequence and at least at a first predetermined rate to indicate at least one of a number of predetermined abnormal functions of the heart, and to sequentially illuminate each of said light emitting means, and consequently said elements, in second predetermined illumination sequence and at a second predetermined rate to indicate the normal functioning of the heart;
- selection means coupled to the control means for operator selection of any one of said predetermined illumination sequences;
- a dummy pacemaker operable to be physically attached to the teaching device during the teaching process;
- a dummy electrode operable to be physically attached to the illustration of the heart, whereby the possible portions of the heart which a pacemaker will stimulate, may be illustrated; and
- first indicia at said dummy pacemaker and dummy electrode and second indicia at said predetermined element, each of said indicia being responsive to the connecting of said dummy electrode to said heart to indicate that the connection has been made.

2. A teaching device as claimed in claim 1 wherein:
said light emitting means are light emitting diodes;
said illustration is in the form of a transparency; and
said light emitting diodes are mounted behind said transparency.

3. A teaching device as claimed in claim 2 wherein said first and second indicia comprise light emitting diodes.

4. A teaching device as claimed in claim 1 wherein said selection means further comprise a speed control operable to adjust the speed at which said elements are sequentially illuminated.

5. A teaching device as claimed in claim 1 wherein said control means is operable to illuminate said light emitting means in a plurality of predetermined illumination sequences to indicate a plurality of predetermined abnormal functions.

* * * * *

UNITED STATES PATENT AND TRADEMARK OFFICE
CERTIFICATE OF CORRECTION

PATENT NO. : 4,091,549
DATED : May 30, 1978
INVENTOR(S) : Jack Driller, David Porter and William Henriksen It is certified that error appears in the above—identified patent and that said Letters Patent are hereby corrected as shown below:

Col. 4, in Table 1, the last column, the designation "G" should be inserted as the seventh entry corresponding to the Purkinje Fibres name entry.

Signed and Sealed this

Thirty-first Day of October 1978

[SEAL]

Attest:

RUTH C. MASON
Attesting Officer

DONALD W. BANNER
Commissioner of Patents and Trademarks